United States Patent
Liang et al.

(10) Patent No.: US 8,218,394 B2
(45) Date of Patent: Jul. 10, 2012

(54) METHOD FOR IMAGING THE EARTHS SUBSURFACE USING PASSIVE SEISMIC INTERFEROMETRY AND ADAPTIVE VELOCITY FILTERING

(75) Inventors: Chuntao Liang, Houston, TX (US); Michael P. Thornton, Houston, TX (US); Peter M. Duncan, Houston, TX (US)

(73) Assignee: Microseismic, Inc., Houston, TX (US)

( * ) Notice: Subject to any disclaimer, the term of this patent is extended or adjusted under 35 U.S.C. 154(b) by 595 days.

(21) Appl. No.: 12/485,081

(22) Filed: Jun. 16, 2009

(65) Prior Publication Data

US 2010/0315902 A1    Dec. 16, 2010

(51) Int. Cl.
*G01V 1/36* (2006.01)
(52) U.S. Cl. .............. 367/40; 367/43; 367/50; 702/17; 702/18
(58) Field of Classification Search .............. 367/40, 367/43, 50; 702/17–18
See application file for complete search history.

(56) References Cited

U.S. PATENT DOCUMENTS

| | | | | |
|---|---|---|---|---|
| 3,274,541 A * | 9/1966 | Embree | | 367/62 |
| 3,395,386 A * | 7/1968 | Brown et al. | | 367/43 |
| 3,576,522 A * | 4/1971 | Doty et al. | | 367/40 |
| 3,812,457 A * | 5/1974 | Weller | | 367/36 |
| 4,390,973 A * | 6/1983 | Rietsch | | 367/40 |
| 4,432,078 A * | 2/1984 | Silverman | | 367/37 |
| 4,740,928 A * | 4/1988 | Gutowski et al. | | 367/27 |
| 5,050,130 A * | 9/1991 | Rector et al. | | 367/41 |
| 5,191,557 A * | 3/1993 | Rector et al. | | 367/41 |
| 5,616,840 A * | 4/1997 | Tang | | 73/152.05 |
| 2009/0185448 A1* | 7/2009 | Duncan et al. | | 367/40 |
| 2010/0265094 A1* | 10/2010 | Zannoni et al. | | 340/853.3 |
| 2011/0069581 A1* | 3/2011 | Krohn | | 367/43 |

* cited by examiner

*Primary Examiner* — Mark Hellner
*Assistant Examiner* — Ari M Diacou
(74) *Attorney, Agent, or Firm* — Richard A. Fagin

(57) ABSTRACT

A method of imaging the Earth's subsurface using passive seismic interferometry tomography includes detecting seismic signals from within the Earth's subsurface over a time period using an array of seismic sensors, the seismic signals being generated by seismic events within the Earth's subsurface. The method further includes adaptively velocity filtering the detected signals. The method further includes cross-correlating the velocity filtered seismic signals to obtain a reflectivity series at a position of each of the seismic sensors.

21 Claims, 6 Drawing Sheets

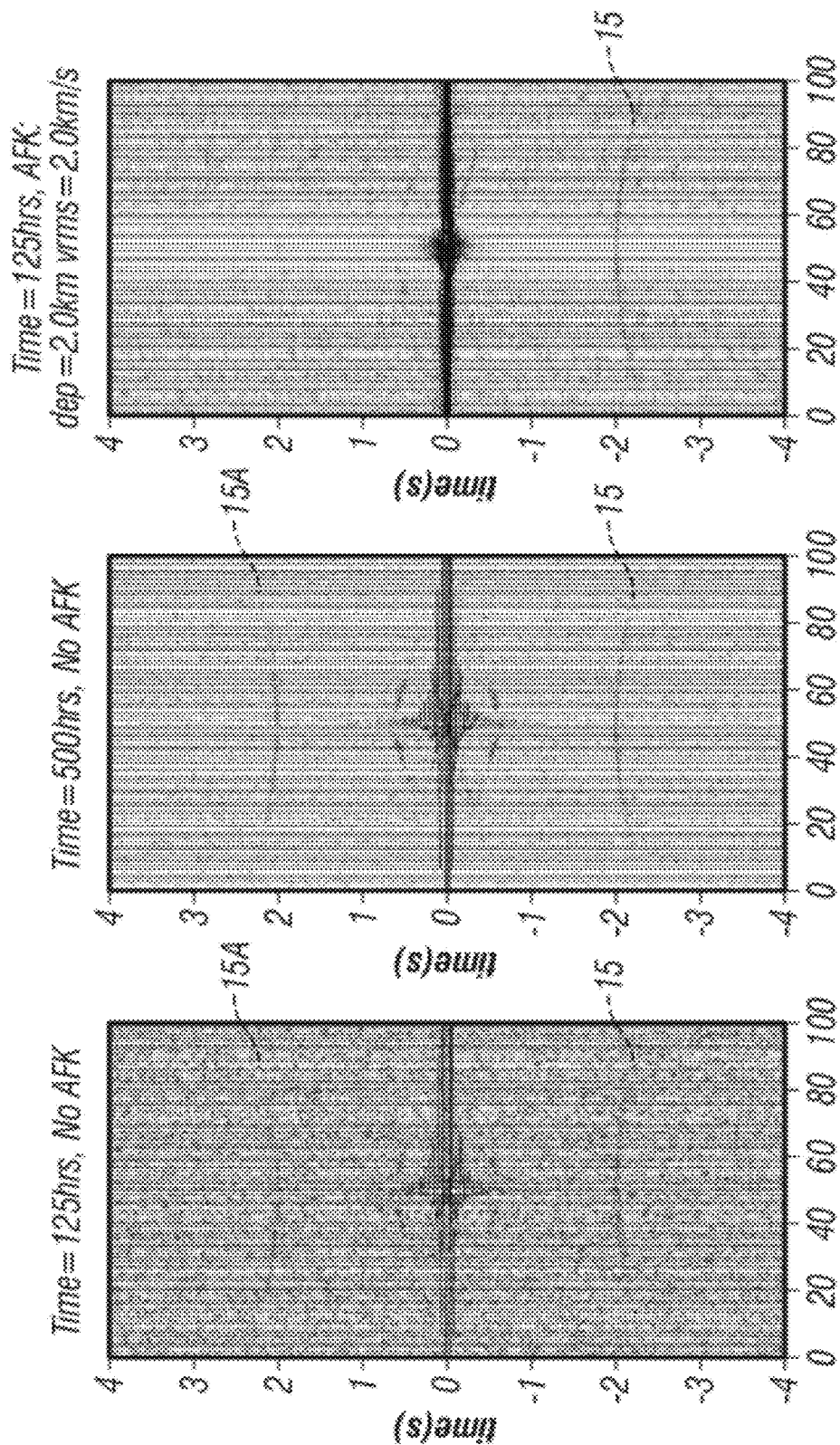

8,218,394 B2

METHOD FOR IMAGING THE EARTHS SUBSURFACE USING PASSIVE SEISMIC INTERFEROMETRY AND ADAPTIVE VELOCITY FILTERING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of seismic imaging of the Earth's subsurface. More specifically, the invention relates to imaging of the Earth's subsurface using passive seismic interferometry techniques.

2. Background Art

Passive seismic emission interferometry techniques include detecting seismic signals from within the Earth's subsurface. As contrasted with conventional controlled source seismic exploration techniques (wherein a seismic source is actuated near the Earth's surface), in passive seismic interferometry, the seismic signals are generated by seismic events taking place within the Earth's subsurface. The subsurface seismic events may be naturally-occurring or may be induced by manmade activities. These seismic events may be located anywhere within the subsurface and their locations are not required to be known. The seismic signals are detected by an array of seismic sensors positioned at or near the Earth's surface generally above a volume of interest within the Earth's subsurface.

In some cases it may be undesirable to use conventional controlled source seismic techniques for evaluating the Earth's subsurface, for example, if a particular area is environmentally sensitive so as to make access and use of seismic sources unsafe or impracticable. There is a need for passive seismic methods that can make three dimensional images of the Earth's subsurface similar to those obtained using conventional controlled source seismic exploration techniques. Passive seismic methods may also substantially reduce the cost of the data acquisition for subsurface imaging.

SUMMARY OF THE INVENTION

A method of imaging the Earth's subsurface according to one aspect of the invention includes detecting passive seismic signals from within the Earth's subsurface over a selected time period using an array of seismic sensors positioned proximate a volume of interest in the Earth's subsurface. The method includes applying an adaptive velocity filter to the detected signals. The method further includes cross-correlating the velocity filtered signals to obtain a reflectivity series at each of the seismic sensors. The method may include using the reflectivity series at each of the seismic sensors to generate an image of the Earth's subsurface.

Other aspects and advantages of the invention will be apparent from the following description and the appended claims.

BRIEF DESCRIPTION OF THE DRAWINGS

FIGS. 3A, 3B and 3C show, respectively, cross correlation functions for each of a plurality of synthetic sensor signals generated using the model shown in FIG. 2, for a signal recording time of 125 hours without adaptive velocity filtering, 500 hours without adaptive velocity filtering and 125 hours with adaptive velocity filtering.

DETAILED DESCRIPTION

Figure 1:
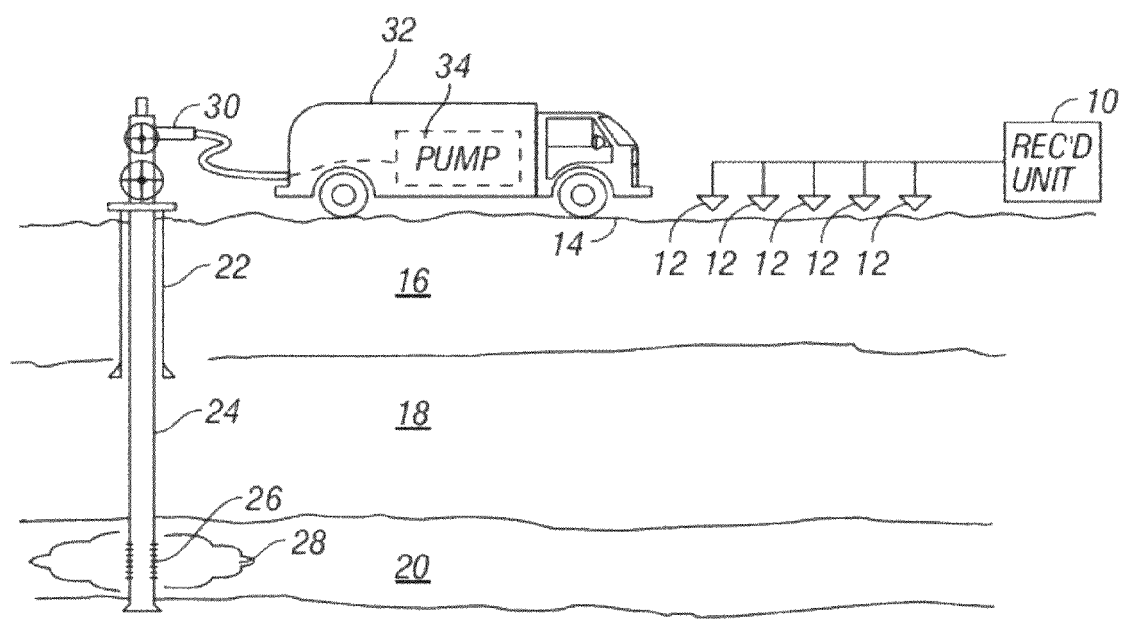
FIG. 1 shows an arrangement of seismic sensors used in one example of a passive seismic detection technique.

The invention will now be described in detail with reference to a few examples, as illustrated in the accompanying drawings. In describing the examples, numerous specific details are set forth in order to provide a thorough understanding of the invention. However, it will be apparent to those skilled in the art that the invention may be practiced without some or all of such specific details. In other instances, well-known features and/or process steps have not been described in detail so as not to unnecessarily obscure the invention. In addition, like or identical reference numerals are used to identify common or similar elements.

Generally, a method according to the invention uses "passive" seismic signals to image a selected volume in the Earth's subsurface. Passive seismic signals may be produced by natural phenomena in the subsurface, such as microearthquakes, or, in some examples, the passive seismic signals may be induced in the subsurface, such as when one or more subsurface formations are fractured by pumping fluid therein in a process called "hydraulic fracturing." Passive seismic signals are thus distinguishable from "active" or "controlled source" seismic signals, which are produced by actuating a seismic energy source having controllable actuation timing, and in many cases controllable spectral content.

FIG. 1 shows a wellbore 22 drilled through subsurface formations 16, 18, 20. In this example, one of the subsurface formations, shown at 20 can be a hydrocarbon producing formation. A wellbore tubing 24 including perforations 26 for receiving fluid from the hydrocarbon producing formation 20 is deployed in the wellbore 22. The wellbore tubing 24 is connected to a surface wellhead 30 including an assembly of valves (not indicated separately) for controlling fluid flow. The wellhead 30 may be hydraulically connected to a pump 34, which may be a component of a "fracture pumping unit" 32. The fracture pumping unit 32 may be used to pump fluid down the wellbore 22 and into the subsurface formations, particularly the hydrocarbon producing formation 20, in a well process. i.e., hydraulic fracturing. For illustration purposes, the movement of fluid into the hydrocarbon producing formation 20 is indicated by the fluid front 28. In hydraulic fracturing, the fluid is pumped into the hydrocarbon producing formation 20 at a pressure which exceeds the fracture pressure of the hydrocarbon producing formation 20, causing the hydrocarbon producing formation 20 to rupture and develop fissures. The fracture pressure is generally related to the overburden pressure, i.e., the pressure exerted by the weight of all the formations above the hydrocarbon producing formation. The fluid pumped into the hydrocarbon producing formation 20 may include proppant, i.e., solid particles having a selected size. In propped fracturing operations, the particles of the proppant move into fissures formed in the hydrocarbon producing formation 20 and remain in the fissures after the fluid pressure is reduced below the fracture pressure of the formation, thereby propping the fissures open for subsequent fluid production from the hydrocarbon producing formation. Hydraulic fracturing with proppant has the effect of increasing the effective radius of the wellbore 22 that is in hydraulic communication with the hydrocarbon production formation 20, thus substantially increasing the productive capacity of the wellbore 22.

FIG. 1 shows an array of seismic sensors 12 arranged proximate to the Earth's surface 14 to detect seismic energy originating from within one or more the subsurface formations 16, 18, 20. In marine applications, the array of seismic sensors 12 could be arranged at or proximate to the water bottom in a cable-based device known as an "ocean bottom cable." The seismic sensors 12 detect seismic energy created, for example, by hydraulic fracturing of the hydrocarbon producing formation 20. The seismic energy may also result from other seismic events occurring within the Earth's subsurface, for example, microearthquakes.

In some examples, the seismic sensors 12 may be arranged in sub-groups, with spacing between individual sensors in each of the sub-groups being less than about one-half the expected wavelength of seismic energy from the Earth's subsurface that is intended to be detected. Signals from all the seismic sensors 12 in one or more of the sub-groups may be added or summed to reduce the effects of noise in the detected signals. The seismic sensors 12 generate electrical or optical signals in response to particle motion, velocity or acceleration. A recording unit 10 is in signal communication with the seismic sensors 12 for making a time-indexed recording of the seismic signals detected by each seismic sensors 12. In some examples the seismic sensors 12 are geophones. In other examples, the seismic sensors 12 may be accelerometers or other sensing devices known in the art that are responsive to motion, velocity or acceleration, of the formations proximate to the particular sensor. Some types of seismic sensors may include a plurality of mutually orthogonally arranged particle motion responsive sensing elements to detect particle motion along different directions, e.g., shear waves. Accordingly, the type of seismic sensor is not a limit on the scope of the present invention.

In one example, the seismic sensors 12 may be arranged in a radially extending, spoke like pattern, with the center of the pattern disposed approximately about the surface position of the wellbore 22. Alternatively, if the geodetic position of the formations at which the fluid enters from the wellbore is different than the surface geodetic position of the wellbore 22, the sensor pattern may be centered about such geodetic position. Such sensor pattern is used in fracture monitoring services provided under the service mark FRACSTAR, which is a registered service mark of Microseismic, Inc., Houston, Tex., also the assignee of the present invention.

The recording unit 10 may include (not shown separately) a general purpose programmable computer or a dedicated program computer including data storage and display devices that may perform a process according to the present invention and store and/or display the results of the process. The type of computer used to implement the method and the type of display and/or storage devices are not limits on the scope of the present invention.

Figure 2:
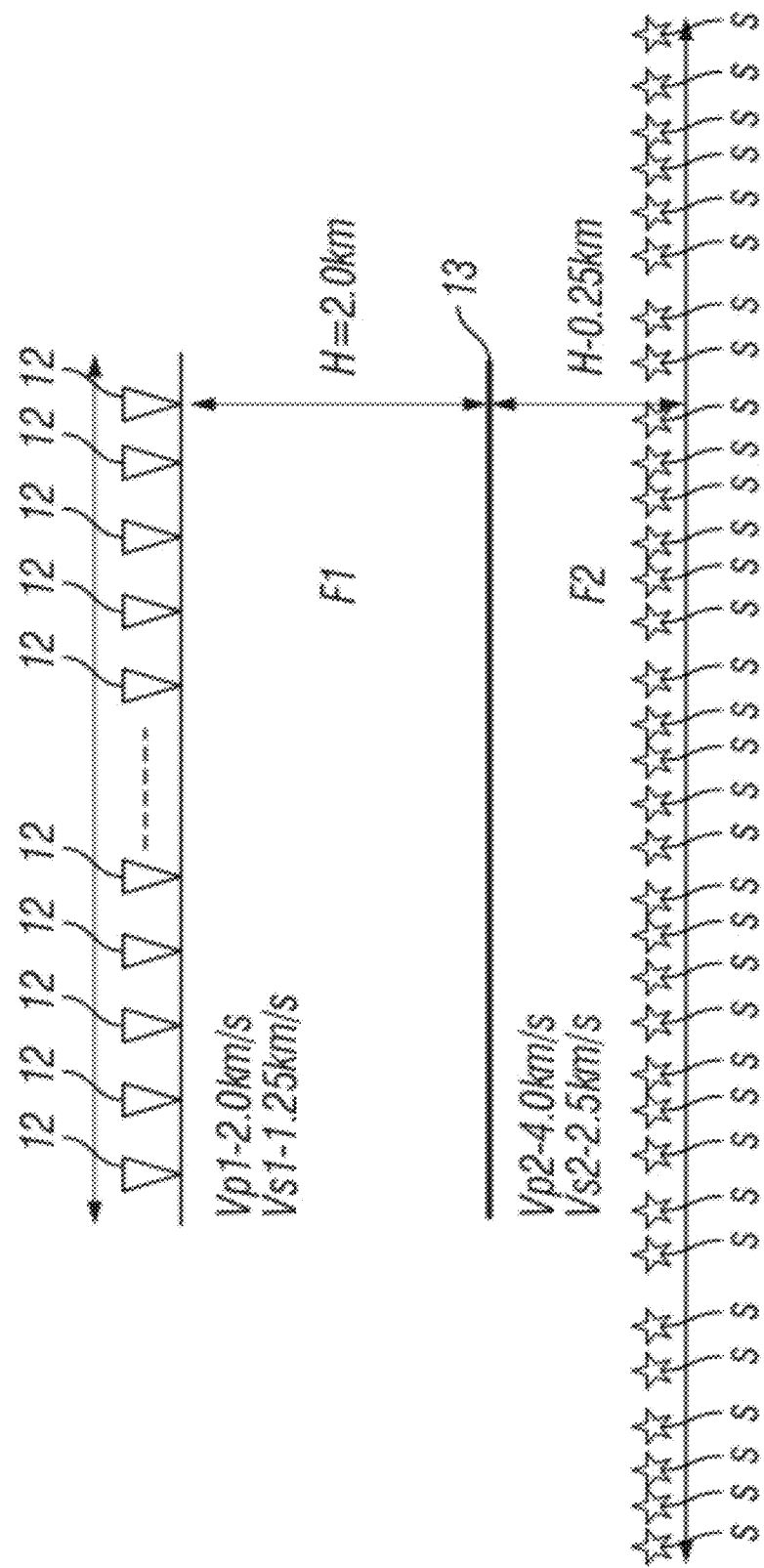
FIG. 2 shows a two dimensional model of subsurface formations used to numerically test an example method according to the invention.

Having explained acquisition of seismic signals used in the present invention, more detailed explanation of the various elements of a method according to the invention will now be explained with reference to FIG. 2. A numerical simulation of naturally occurring seismic data and/or induced seismic events such as fracturing explained above was generated to test a method according to the invention. FIG. 2 shows a model of subsurface rock formations used to generate synthetic, subsurface-occurring seismic signals. Geodetic positions of simulated seismic sensors (e.g., corresponding to 12 in FIG. 1) are shown disposed at spaced apart, known positions above a first subsurface formation F1. The first formation F1 has a simulated compressional velocity of 2.0 km/second and a simulated shear velocity of 1.25 km/second. A thickness of the first formation F1 is 2.0 km, and the first formation F1 extends below the sensors 12 to a lower boundary 13 thereof. A second formation F2 is located below the boundary 13. The second formation F2 has a simulated compressional velocity of 4.0 km/second and a simulated shear velocity of 2.5 km/second. A plurality of randomly distributed, subsurface-occurring seismic energy sources S are shown as being 0.25 km below the boundary 13. The sources S can have seismic energy characteristics similar to a fracture (microearthquake) occurring at the geodetic position of each source S shown in FIG. 2. A time of occurrence of each source S may be random with respect to the time of occurrence of any other source S. Thus, synthetic seismic signals corresponding to each sensor represent signals that would have been measured by actual seismic sensors if they had been disposed above actual formations having the velocities and thicknesses shown, and if seismic events occurred at the positions shown for the sources disposed in the second formation F2.

The synthetic seismic signals were continuously generated for a simulated time period of 500 hours with 1000 seismic events occurring within each hour at random time and random location. Data representing seismic signal recordings for each of the sensors 12 were generated to correspond to the signal that would be detected at each sensor 12 after simulated seismic energy traveled through the model formations F1, F2 to the position of each of the sensors 12.

Radom noise was also added to the signals generated by seismic events and the peak amplitude of seismic signals of each event varies between 0.5 to 2.0 times of the peak amplitude of the random noise. The random noise is similar in nature and represents the background noise present on all seismic signal recordings.

FIGS. 3A, 3B and 3C show cross-correlation functions between signals generated at each of the simulated sensors in FIG. 2 with the signal of the centermost sensor in FIG. 2. FIG. 3A shows cross-correlation of 125 hours of simulated seismic signal recording. An event corresponding to the boundary (13 in FIG. 2) is apparent at 15 in FIG. 3A. The event appearing at 15A represents seismic waves traveling in the "negative" direction compared to the event at 15. FIG. 3B shows cross-correlation functions for signals recorded over a 500 hour time period.

FIG. 3C shows cross-correlation functions for signals that were adaptively velocity filtered prior to cross-correlation. The cross-correlations shown in FIG. 3C represent signals recorded over only 125 hours. The event 15 is much more clearly visible than in either of FIG. 3A and 3B. The inverse event visible in 15A is not visible in FIG. 3C because only waves traveling at a positive velocity are kept and they can be extracted by applying a negative velocity passband.

The example shown in FIG. 3C suggests that the present invention can significantly improve the signal to noise ratio of the reflected event 15, and it also significantly reduces the time length needed to extract reflectivity from passive seismic data and thus make this technique more efficient.

Figure 4A:
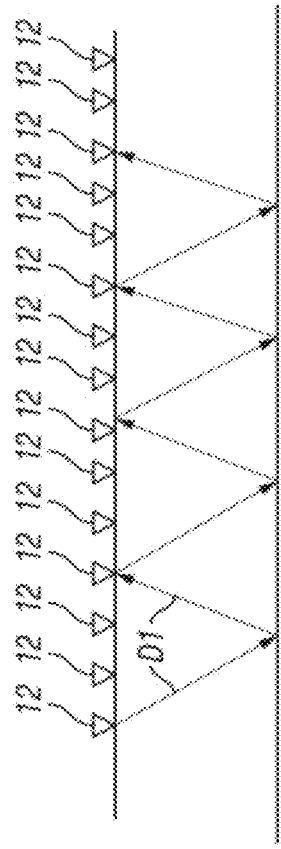
FIG. 4A shows sensors whose signals that are cross correlated to generate a first common offset gather.

In the present example, adaptive velocity filtering may be performed by filtering in selected velocity passbands in the frequency-wavenumber (f, k) domain. The velocity passbands may be selected by determining an apparent velocity of seismic energy through the subsurface from the seismic signals themselves. Referring to FIG. 4A, the seismic sensors 12 are shown disposed at spaced apart locations proximate the volume of the subsurface to be evaluated. A first apparent velocity may be determined by selecting pairs of sensors for cross correlation that have substantially the same distance between them along the surface (called "common offset"). The offset selected for the sensors in FIG. 4A is shown by the dimension D1. For any individual subsurface boundary (e.g., corresponding to the boundary 13 in FIG. 2), an apparent velocity will be related to the offset. The apparent velocity C1 may be used to set a corresponding center velocity value of a velocity passband for the velocity filter. Thus, the velocity passband may be represented by [C1−dc, C1+dc], where dc represents one half the passband width. The passband width may be determined empirically, for example.

Figure 4B:
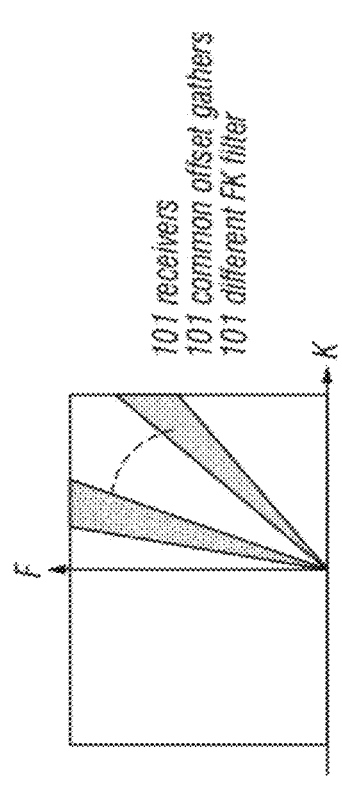
FIG. 4B graphically illustrates frequency wavenumber (f, k) velocity filtering as may be used in some examples.
Figure 4C:
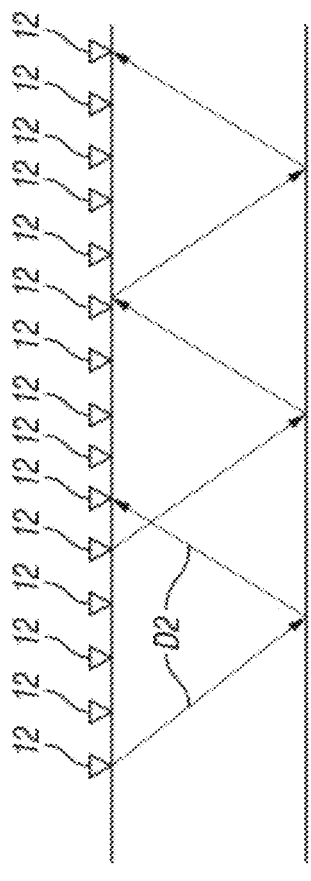
FIG. 4C shows sensors whose signals are cross correlated to generate a second common offset gather.

As illustrated in FIG. 4B, for a set of 101 seismic sensors, there will be 101 different common offset gathers, and correspondingly, 101 different velocity filters. The graph in FIG. 4B illustrates the velocity passband used for two of the velocity filters, wherein a slope of the center line of each filter is related to the center velocity of each filter passband. FIG. 4C illustrates selecting a second center velocity by selecting a second offset between sensors D2 for each cross correlation.

A result of velocity filtering is that seismic waves having apparent velocities outside the selected filter passband will be excluded from the cross correlations of signals between selected ones of the sensors.

Figure 5:
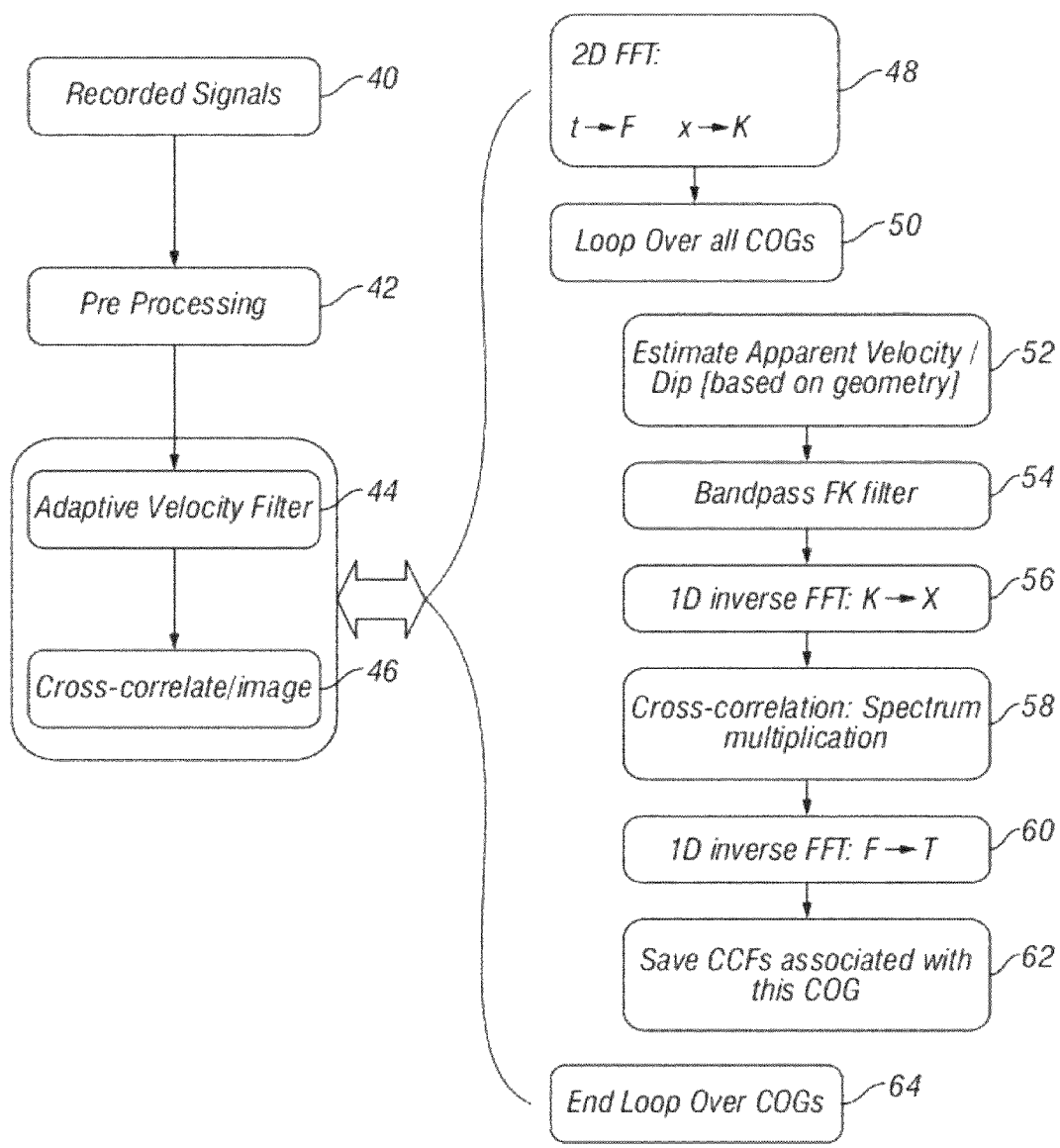
FIG. 5 shows a flow chart of an example signal processing technique.

An example process according to the invention is explained with reference to the flow chart in FIG. 5. At 40, seismic signals are recorded, for example, using an arrangement such as shown in FIG. 1. Recording signals may take place during fracturing operations as explained with reference to FIG. 1, or may take place absent such fracturing operations. Recording signals may occur over a selected time interval, for example 50 hours. Other examples may use more or less recording time. At 42, the recorded signals may be processed, for example, by bandpass filtering and other preprocessing techniques known in the art. At 44, adaptive velocity filtering may be performed. In the present example, the velocity filtering may be performed in the (f, k) domain. To perform such filtering, first the recorded signals may be transformed, at 48, into the (f, k) domain. A process loop may be initialized at 50 over all possible common offset gathers, that is, pairs of signal recordings corresponding to pairs of seismic sensors (12 in FIG. 1) having substantially the same offset. For each offset, at 52, an estimated velocity is determined. Such estimated velocity may be determined using the value of offset for each pair of sensors in the particular common offset and a seismic velocity that may be obtained, for example, from active source seismic data or other available source. The value of velocity where there are several subsurface formations each having a different velocity may be, for example, the RMS velocity. The value of velocity is used, at 54, to velocity bandpass filter each seismic signal in the common offset gather. The filtered signals in each common offset gather may then be cross-correlated in the (f, k) domain. In the present example, such cross correlation may be performed, at 56 by inverse transforming the filtered signals from the (f, k) domain to the frequency-position (f, x) domain. Cross-correlation may then be performed, at 58 by spectrum multiplication. At 60, the cross-correlations for each sensor position may be inversely transformed back to the space-time (x, t) domain to provide a cross correlation function corresponding to each sensor position for each value of offset. The foregoing process loop may be repeated, at 64, for each common offset gather. At 46, the process may use the cross correlation functions to produce a reflectivity series corresponding to each sensor position. The reflectivity series is the seismic energy reflection coefficient with respect to depth and may be understood as the reflected waves emitted from one sensor position and recorded by a sensor at another position, or of a sensor pair involved in the cross-correlation. The reflectivity series may be used, for example, to produce an image of the subsurface formations. One possible result of a process according to the invention is a reflectivity series corresponding to the geodetic position of each seismic sensor 12. The method can include using such reflectivity series to generate a two or three-dimensional (3D) image of the Earth's subsurface formations. Any suitable 3D seismic image software or tool known in the art may be used to generate the 3D image of the Earth's subsurface formation. Two non-limiting examples of such imaging software include those sold under the trademarks Ω-TIME and Ω-DEPTH, both of which are trademarks of WesternGeco LLC, Houston, Tex.

Figure 6:
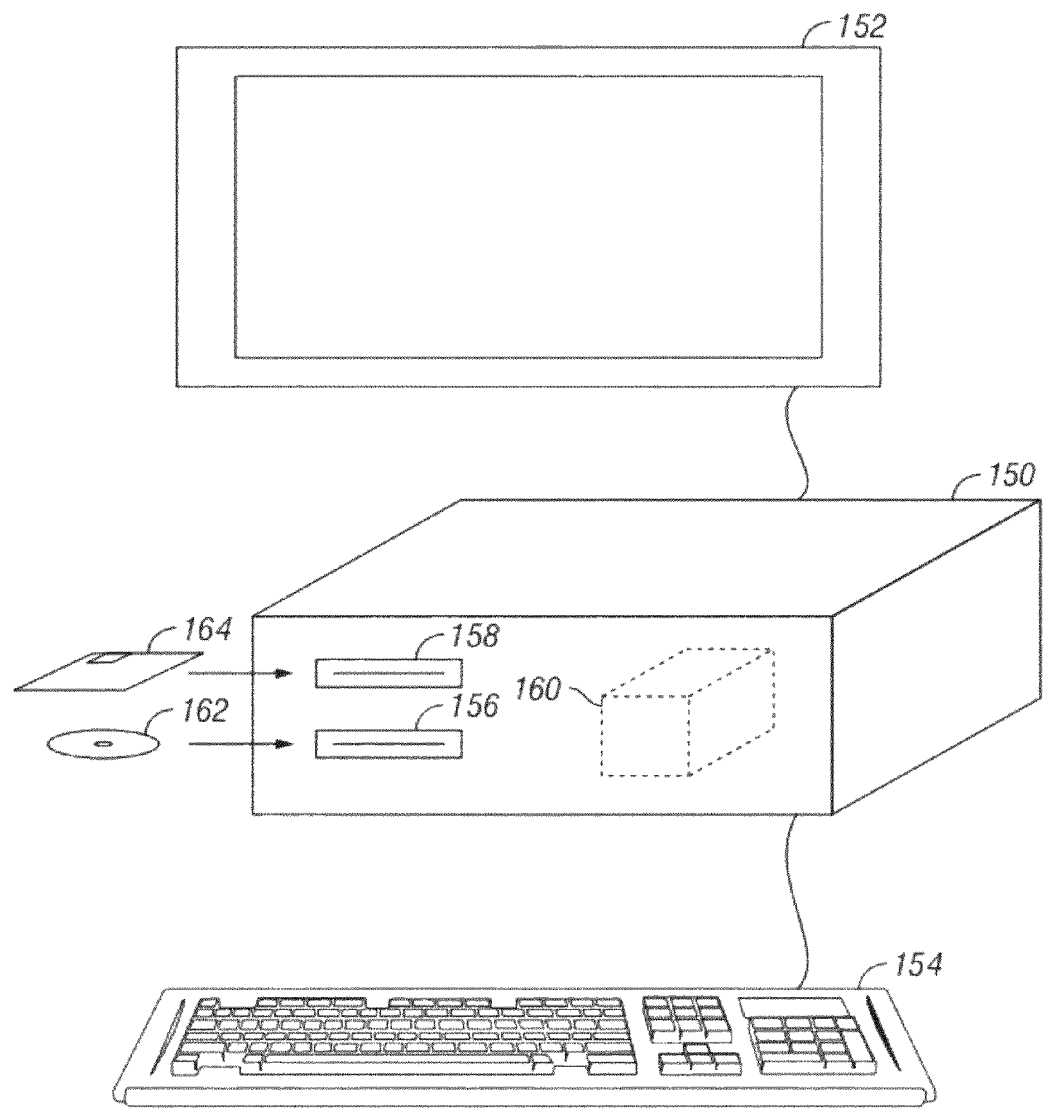
FIG. 6 shows a programmable computer and computer readable media.

In another aspect, the invention relates to computer programs stored in computer readable media. Referring to FIG. 6, the foregoing process as explained with reference to FIGS. 1-5, can be embodied in computer-readable code. The code can be stored on a computer readable medium, such as floppy disk 164, CD-ROM 162 or a magnetic (or other type) hard drive 166 forming part of a general purpose programmable computer. The computer, as known in the art, includes a central processing unit 150, a user input device such as a keyboard 154 and a user display 152 such as a flat panel LCD display or cathode ray tube display. The computer may form part of the recording unit (10 in FIG. 1) or may be another computer. According to this aspect of the invention, the computer readable medium includes logic operable to cause the computer to execute acts as set forth above and explained with respect to the previous figures.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for imaging the Earth's subsurface using passive seismic emissions, comprising:

detecting seismic signals originating from within the Earth's subsurface over a selected time period using an array of seismic sensors deployed proximate the Earth's surface;

velocity filtering the detected seismic signals using a computer, wherein a velocity passband for the velocity filtering is selected by estimating an apparent velocity based on offset between selected pairs of the seismic sensors having a same offset therebetween; and cross-correlating seismic signals detected at selected ones of the seismic sensors to signals detected at other selected ones of the seismic sensors using a computer to obtain a reflectivity series at a geodetic position each of the selected ones of the seismic sensors.

2. The method of claim 1, further comprising generating an image of the Earth's subsurface using the reflectivity series at each of the selected ones of the seismic sensors.

3. The method of claim 1, wherein cross-correlating comprises determining a degree of similarity between an entire signal record of the selected ones of the seismic sensors and an entire signal record of each of the other selected ones of the seismic sensors.

4. The method of claim 1, wherein determining a degree of similarity is performed for a selected range of time offset.

5. The method of claim 1, wherein detecting seismic signals comprises deploying seismic sensors at the Earth's surface.

6. The method of claim 5, wherein deploying the seismic sensors at the Earth's surface comprises deploying the seismic sensors in a substantially radial pattern around selected position at the Earth's surface.

7. The method of claim 6 wherein the selected position is at least one of a surface position of a wellbore and a surface position of a fluid exit point from a wellbore into a subsurface formation.

8. The method of claim 1, further comprising inducing a seismic event in the Earth's subsurface.

9. The method of claim 8, wherein the inducing a seismic event comprises hydraulically fracturing a formation in the Earth's subsurface.

10. The method of claim 1 wherein the velocity filtering comprises frequency-wavenumber filtering.

11. The method of claim 1 wherein an apparent velocity is selected for each possible value of offset between selected pairs of sensors.

12. A computer readable medium having a computer program thereon, the computer program having logic operable to cause a programmable computer to perform steps, comprising:
   detecting seismic signals originating from within the Earth's subsurface over a selected time period using an array of seismic sensors deployed proximate the Earth's surface;
   velocity filtering the detected seismic signals, wherein a velocity passband for the velocity filtering is selected by estimating an apparent velocity based on offset between selected pairs of the seismic sensors having a same offset therebetween; and
   cross-correlating seismic signals detected at selected ones of the seismic sensors to signals detected at other selected ones of the seismic sensors to obtain a reflectivity series at a geodetic position each of the selected ones of the seismic sensors.

13. The computer readable medium of claim 12, wherein the logic further comprises generating an image of the Earth's subsurface using the reflectivity series at each of the selected ones of the seismic sensors.

14. The computer readable medium of claim 12, wherein cross-correlating comprises determining a degree of similarity between an entire signal record of the selected ones of the seismic sensors and an entire signal record of each of the other selected ones of the seismic sensors.

15. The computer readable medium of claim 12, wherein determining a degree of similarity is performed for a selected range of time offset.

16. The computer readable medium of claim 12, wherein detecting seismic signals comprises deploying seismic sensors at the Earth's surface.

17. The computer readable medium of claim 16, wherein deploying the seismic sensors at the Earth's surface comprises deploying the seismic sensors in a substantially radial pattern around selected position at the Earth's surface.

18. The computer readable medium of claim 17 wherein the selected position is at least one of a surface position of a wellbore and a surface position of a fluid exit point from a wellbore into a subsurface formation.

19. The computer readable medium of claim 12, wherein the detected seismic signals result from inducing a seismic event the Earth's subsurface.

20. The computer readable medium of claim 12 wherein the velocity filtering comprises frequency-wavenumber filtering.

21. The computer readable medium of claim 20 wherein the inducing a seismic event comprises hydraulically fracturing a formation in the Earth's subsurface.

* * * * *